United States Patent [19]

Fedrigo

[11] Patent Number: 4,861,088
[45] Date of Patent: * Aug. 29, 1989

[54] VEHICLE TAILGATE ASSEMBLY

[76] Inventor: Joseph G. Fedrigo, 3615 Reposo Way, Belmont, Calif. 94002

[*] Notice: The portion of the term of this patent subsequent to May 10, 2005 has been disclaimed.

[21] Appl. No.: 117,713

[22] Filed: Nov. 4, 1987

Related U.S. Application Data

[63] Continuation-in-part of Ser. No. 904,110, Sep. 4, 1986, Pat. No. 4,743,058.

[51] Int. Cl.⁴ .............................................. B62D 25/00
[52] U.S. Cl. .................................. 296/57.1; 296/180.1
[58] Field of Search ............ 296/1 S, 50, 51, 53-57 A

[56]  References Cited

U.S. PATENT DOCUMENTS

| | | | |
|---|---|---|---|
| 4,063,772 | 12/1977 | Kincaid | 296/1 S |
| 4,136,905 | 1/1979 | Morgan | 296/50 |
| 4,165,118 | 8/1979 | Jensen | 296/50 |
| 4,201,411 | 5/1980 | Morgan | 296/50 |
| 4,353,589 | 10/1982 | Hartberg | 296/50 |
| 4,372,601 | 2/1983 | Smith | 296/50 |
| 4,475,759 | 10/1984 | Wine | 296/1 S |

Primary Examiner—Robert R. Song
Attorney, Agent, or Firm—Douglas A. Chaikin

[57] ABSTRACT

Disclosed herein is a vehicle tailgate assembly for use with load carrying vehicle which use an open cargo compartment. The tailgate assembly includes a frame having a central opening, an air permeable screen to permit the free flow of air secured within the central opening, a material shield hingedly mounted to the frame sized and shaped to fit substantially completely over the entire screen to prevent the loss cargo when the cargo consists of small objects, and a latching mechanism for selectively latching the material shield to the frame.

9 Claims, 2 Drawing Sheets

VEHICLE TAILGATE ASSEMBLY

RELATED PATENT APPLICATION INFORMATION

This application is a continuation-in-part application of co-pending patent application 06/904,110 filed Sept. 4, 1986, now U.S. Pat. No. 4,743,058 for Tailgate Construction to Joseph G. Fedrigo which is specifically incorporated herein by 1. Field of the Invention This invention relates to tailgate assemblies for vehicles which have open load carrying compartments and more particularly to tailgate assemblies for vehicles which carry loads of varying densities.

2. Background of the Invention

Many vehicles have an open load carrying compartment, which generally includes a pair of sidewalls and front and rear walls. The rear wall generally defines a tailgate which may be pivoted or in some way opened or removed in order to facilitate the cargo in being emptied and loaded. Examples of cargo compartments are found on pickup trucks and dump trucks. As the vehicle moves along the road, highway or track, wind resistance is encountered primarily on two surfaces, the front of the vehicle, which includes the front wall of the cargo compartment, and the rear wall or tailgate. This wind resistance must be met by increased fuel consumption in moving the vehicle or by reduction of wind resistance through the aerodynamic design of the vehicle and/or the cargo compartment.

Several examples of the prior art have attempted to deal with the problem of wind resistance by including a tailgate having vents. Some prior art has attempted to meet the problem of cargo passing through a vented tailgate. Prior art has attempted to achieve the ends of reduced wind resistance and the prevention of cargo loss through a variety of venting or shielding mechanisms. However, those mechanisms fail to achieve the desired ends in the following regards: They do not supply a complete seal and will lose cargo such as sand, hay or other light or fine matter at the same time that they allow air to pass through the vented wall or tailgate of the cargo compartment, e.g. U.S. Pat. No. 4,063,772 to Kincaid; they have a cargo shield or baffle which provide an incomplete or non locking seal which would also allow fine and loose cargo to pass through the vents with wind pressure, e.g. U.S. Pat. No. 4,165,118 to Jenseon; or they provide complicated mechanisms with a series of latches, locks, hinges, and other moving parts which are time consuming to operate and susceptible of rapid wear due the great number of moving parts, e.g. U.S. Pat. Nos. 4,136,905 and 4,201,411 to Morgan.

SUMMARY OF THE INVENTION

It is a general object of the present invention to provide a efficient tailgate assembly for reducing wind resistance on a vehicle having a cargo compartment.

It is another object of the present invention to provide a tailgate assembly which reduces wind resistance by the use of a vented tailgate and which is conveniently closed by a hinged material shield.

It is a further object of the present invention to reduce wind resistance on the front wall of a vehicle without a cabin by providing a tailgate assembly in accordance with this invention.

In accordance with the above objects, the invention comprises:
- a tailgate frame, the tailgate frame having a central opening, an air permeable screen securely mounted within the opening;
- a material shield hingedly connected to the tailgate frame for preventing the loss of cargo of such a size that it would readily pass through the screen; and means for latching the material shield to the frame.

A reduction in wind resistance and a corresponding increase in fuel economy is achieved when the cargo compartment is empty or the cargo consists of material too large to pass through the use of a vented tailgate with the material shield is in the open position.

The hinged material shield can be easily closed preventing loss of cargo when the cargo consists of material small enough to pass through the vented tailgate. In a preferred embodiment the material shield is hinged at the junction between the vented tailgate and the floor of the cargo compartment. In the preferred embodiment, in the open position, the material shield lies flat on the cargo compartment bed thus allowing air to pass freely through the vented tailgate when the load carrying compartment is empty or has cargo too large to pass through the vents of the tailgate. The material shield swings on its hinges into the closed position adjacent to the vented tailgate and is held in place by one or more magnets in the preferred embodiment. Other latching mechanisms are of course contemplated within the scope of this invention. The magnets are built into the vented tailgate. The magnets are sized and have sufficient strength to withstand the anticipated wind pressure encountered by the vehicle.

When the material shield is in the open position, the field of view of the vehicle operator is also increased. This increases the safe operation of the vehicle as well as providing more convenient backing operation for a pickup truck or dump truck operator. The same advantage is true for hitching a trailer to such vehicles.

These and other objects and advantages of the invention will be appreciated explained and appreciated more fully with reference to the drawing and the description of same as set forth below.

DETAILED DESCRIPTION OF THE PREFERRED EMBODIMENT

Figure 1:
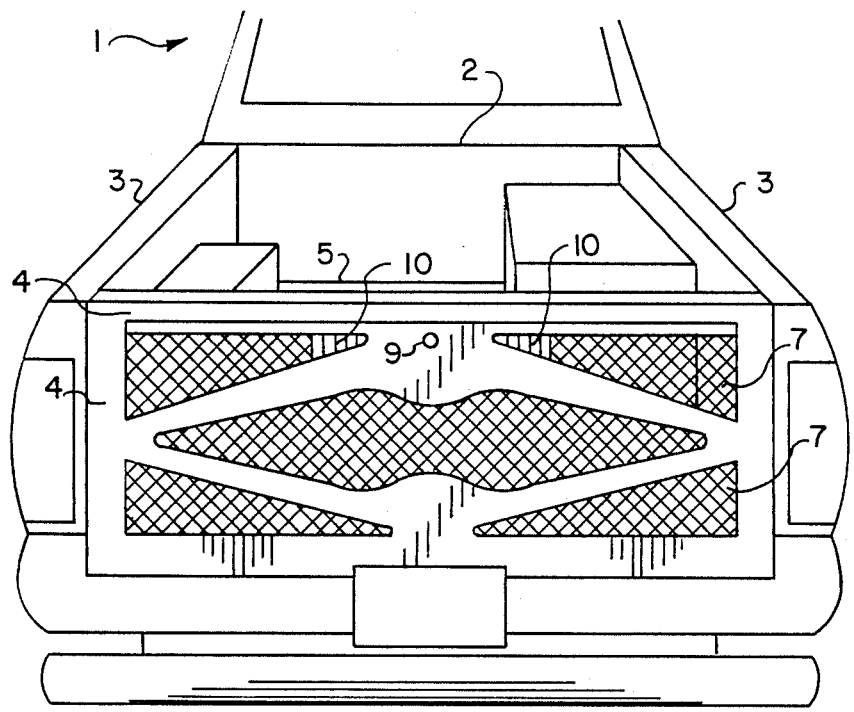
FIG. 1 is a elevational perspective view of the tailgate assembly in accordance with this invention mounted on a pickup truck.

The drawing and description are made with reference to a pickup truck. It will be appreciated that this is for convenience of explanation of the invention only and that the of the tailgate assembly in accordance with this invention may be used in conjunction with other vehicles including, but not limited to, railroad hopper cars, trailers, trains, passenger car luggage racks, helicopter cargo bays and the like, all having cargo bay tailgate assemblies.

The preferred embodiment of the invention will be described with reference to the drawing wherein like reference characters are designate like or corresponding parts throughout the several views. With reference to FIG. 1, there is shown a cargo carrying vehicle generally designated by the numeral 1, specifically depicted in FIG. 1 as a pickup truck with an open-top cargo carrying compartment.

The cargo compartment is formed by the back of the vehicle cabin 2, two sidewalls 3, a tailgate assembly 4, and a truckbed 5. Normally such a cargo carrying vehicle 1 closes the rear wall of the cargo carrying compartment with a closed tailgate assembly 4. Generally, tailgate assembly of others is a solid structure through which no air can flow. Rather, as the vehicle moves forward air presses against the inside or truckbed side of the tailgate assembly 4, causing air drag and increased fuel consumption for increased speed.

Figure 2:
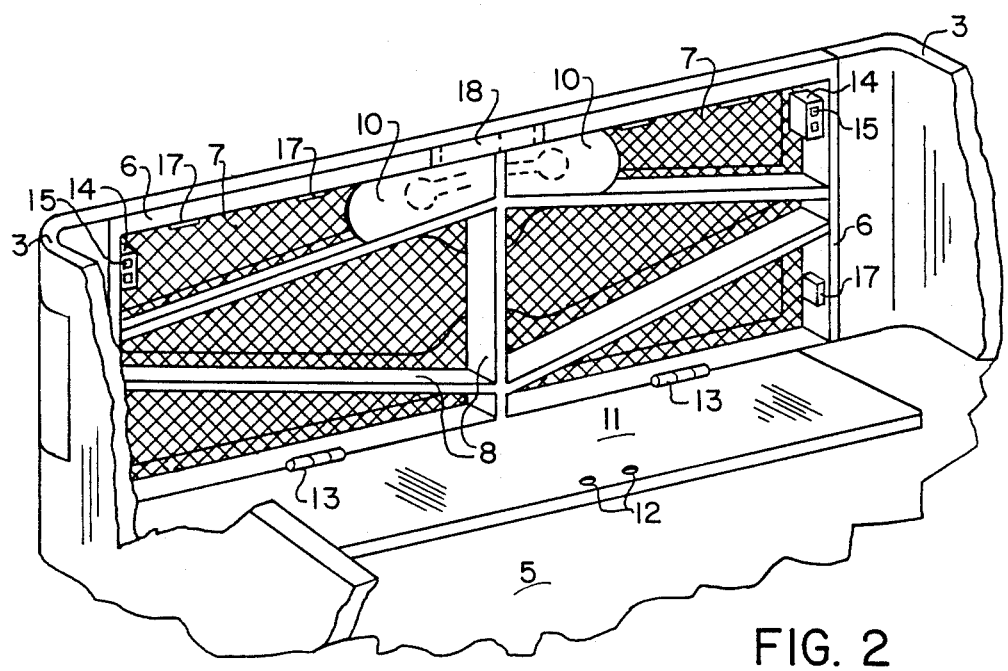
FIG. 2 is a partial sectional perspective view of the tailgate assembly in accordance with this invention illustrating the tailgate in the open position.

FIG. 2 shows the of the tailgate assembly 4, in accordance with this invention, having an air-permeable wall which reduces air drag and fuel consumption. The air-permeable wall defines an air permeable screen 7 through which flows when a material shield 11 is in the open position, namely, lying flat on the truckbed 5.

Figure 4:
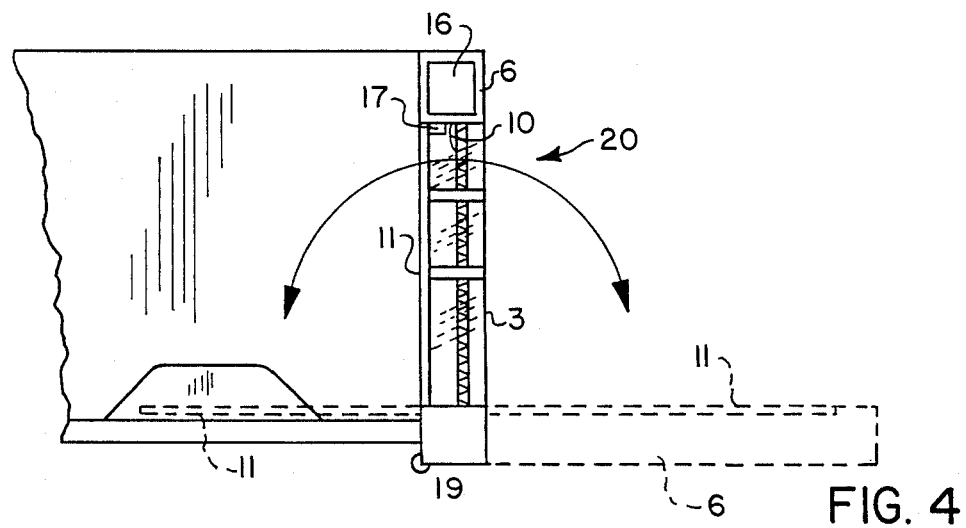
FIG. 4 is a cross section view of the tailgate assembly in accordance with this invention taken along line 4—4 of FIG. 3 in the direction of the arrows.

The material shield 11 can be closed by lifting the shield 11 through grip holes 12 and rotating it upward on its hinges 13 into a position adjacent to the tailgate frame 6 as shown by the arrows in FIG. 4. The shield 11 is then held in place by a latching mechanism, which in the drawing is shown as magnets 15. The magnets 15 are housed in magnet housing 14 which is welded to the tailgate frame 6. With the material shield 11 in the closed position, loose, light or fine cargo may be loaded into the cargo compartment and transported without significant loss. Thus, sand or straw which would be able to escape past the air permeable screen 7 is blocked by the shield and contained within the cargo compartment 6.

When the material shield 11 is in the closed position, the tailgate assembly 4 is held in place by the magnets 15. The tailgate assembly 4 is supported in place by the magnet housing 14, a pair of perimeter support plates 17, and a plurality of support ribs 8. The magnet housing 14, the perimeter support plates 17, and the support ribs 8 are all recessed inside the tailgate frame 6 a distance equal to the thickness of the material shield 11 so that when the material shield 11 is in the closed position, namely, upright and adjacent to the tailgate frame 6, the side of the material shield !1 facing the vehicle cabin 2 or cargo compartment 6 is flush with the side of the tailgate frame 6 facing the vehicle cabin 2. Thus, the interior surface of the tailgate assembly 4 as a whole forms a flat smooth surface. It will be appreciated that the above description of the material shield 11 is applicable when the shield 11 is the closed position whether the tailgate assembly 4 be open for loading cargo into the cargo compartment 6 or be locked for travel with the tailgate assembly 5 upright and locked to the sidewalls 3 by tailgate locking bolts 16.

With particular reference to FIGS. 2 and 4, there is shown the tailgate assembly 4. The tailgate assembly 4 includes a tailgate frame 6 which is made from rectangular steel tubing. A tailgate locking mechanism 9 is located inside the top length of the tailgate frame tubing as is best shown in FIG. 1. It will be appreciated that future improvements in materials may entirely eliminate the need for a frame. Additional material improvements may also change the locking mechanism for locking and holding the material shield 11 in place. It will be appreciated that the invention herein contemplates such material changes within its scope.

The locking mechanism 9 is a conventional locking mechanism found in other pickup trucks with the exception that locking mechanism 9 includes a key and tumbler lock. The tumbler is accessible for repair or replacement through a removable plate 18. The locking mechanism 9 holds the tailgate in the upright, closed position with the tailgate locking bolts 16 which match the bolt holes in the sidewalls 3. The support ribs 8, the perimeter support plates 17 and the magnet housings 14 (with magnets 15 in place) are then welded to the tailgate frame 6. It will be appreciated that the support ribs 8, the perimeter support plates 17 and the magnet housings 14 could also be cast or molded to the side of tailgate frame 6.

To promote safety, extra brake lights 10, are provided. The brake lights 10 are securely positioned between the tailgate frame 6 and the support ribs 8 with the wiring running inside the tailgate frame tubing or underneath the tubing to a switch shown generally by the numeral 20 attached to the sidewalls 3. The switch 20 is a micro switch. The hinges 13 are welded to the material shield 11 and the tailgate frame 6. The tailgate assembly 4 is placed on hinges 19. The tailgate assembly 4 may be opened for loading and closed for travel as shown by the arrows of FIG. 4.

Figure 4A:
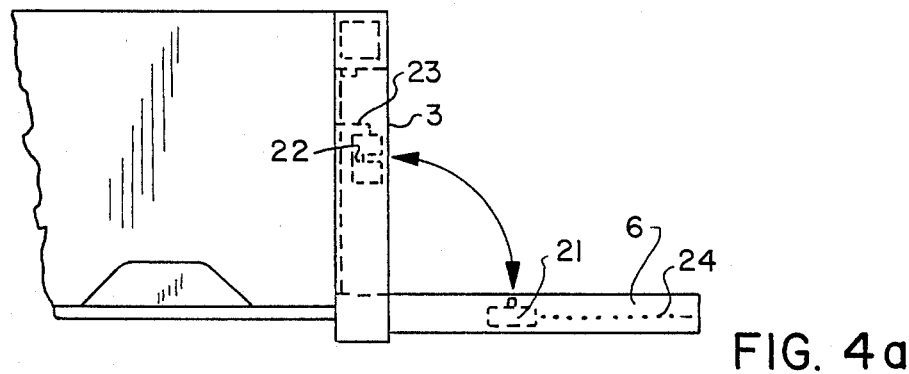
FIG. 4a illustrates the electrical connection of the rear tail lights with the tailgate assembly in accordance with this invention.

As shown in FIG. 4a, the switch 20 includes a male portion 21 in the tailgate assembly 4 and a female portion 22 in the sidewall 3. The portions 21 and 22 are securely mounted by bolting them to their respective positions. The switch 20 disconnects electrical power when the tailgate assembly 4 is opened and allows electrical current to flow when the tailgate assembly 4 is closed. The male and female portions 21 and 22, respectively, are recessed to prevent inadvertent electrical contact and electrical shock of a vehicle operator or a bystander, such as a child. It will be appreciated that the female portion is the hot lead and carries electrical current for lighting the brake lights 10. If the male portion 21 were on the sidewall 3 it would have to extend somewhat beyond the outer surface of the sidewall to make contact with the female portion 22, this could cause possible inadvertent contact with the hot lead resulting in a shock to an operator or a bystander.

The female portion 22 receives electrical current from the truck via wires 23. Upon contact of the female portion 22 with the male portion 21, electrical current can flow to the brake lights 10 via wires 24. The wires 24 lie between the frame tubing and the screen 7 in a channel created thereby. It is preferred to have addition wire loop the male portion 21 in case the wire 24 breaks or wears e.g. rusts.

Figure 3:
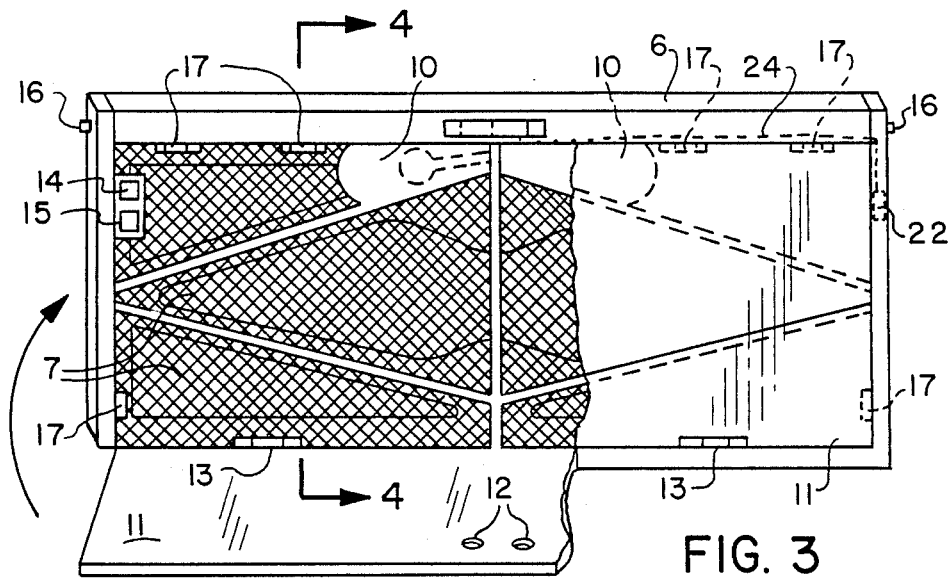
FIG. 3 is a partial cut away perspective view of the tailgate assembly in accordance with this invention with part of the tailgate assembly in the closed position and part of the tailgate assembly in the open position.

FIGS. 3-4 illustrate four possible modes of operation of the tailgate assembly 4: (1) the tailgate assembly 4 is upright and locked to the sidewalls 3 with the material shield 11 in the open position adjacent to the truckbed 5; (2) the tailgate assembly 4 is upright and locked to the side walls 3 with the materials shield 11 in the closed position adjacent to the tailgate frame 6; (3) the tailgate assembly 4 is in the open position adjacent to the truckbed 5; (4) the tailgate assembly 4 is open for cargo loading and the material shield 11 is in the closed position adjacent to the tailgate frame 6.

When the tailgate assembly 4 is open for cargo loading and the material shield 11 is in the closed position the magnet housing 14, the support ribs 8, and the perimeter support plates 17 will support and prevent the straining and warping of the material shield 11 during the time that loads are placed on the material shield 11.

The placement of the support ribs 8 and the perimeter support plates may be varied from the design embodied in the drawing within the spirit and scope of this invention. Any alteration of the design must, however, provide effective support to the material shield 11 and take into consideration the placement of the magnet housing or other locking mechanism and the extra brake lights 10.

The materials described above are illustrative of the best mode of the invention and the invention, of course, may use materials other than steel, for example an alloy of metal or an entirely plastic assembly is possible.

The material shield 11 must also be composed of a heavy-stress bearing material such as steel, or other metal alloys or even engineering plastics. When it is desired to use magnets to hold the material shield in place in the closed position, the stress bearing material must of course either be made of magnetizable material or have the same implanted within it as in the case of engineering plastic.

The preferred embodiment of the screen 7 is made from punched steel. However, the spirit and scope of this invention include any mesh material regardless of type which allow air to freely flow through the screen the vehicle is in motion. For example, simple horizontal and vertical bars crossing perpendicular are included within the spirit and scope of the invention.

What is claimed is:

1. A tailgate assembly for vehicles, comprising:

a tailgate frame, the tailgate frame having a central opening, an air permeable screen securely mounted within the opening;

a material shield hingedly connected to the tailgate frame for preventing the loss of cargo of such a size that it would readily pass through the screen; and means for latching the material shield to the frame.

2. A vehicle tailgate assembly as set forth in claim 1, wherein the material shield is capable of being in the closed position such that the shield covers substantially the entire screen or the open position wherein the shield is rotated away for the screen to permit free flow of air.

3. A vehicle tailgate assembly as set forth in claim 1, wherein the latching means define the shield being made from a ferrous material and the frame including at least one magnet.

4. A vehicle tailgate assembly as set forth in claim 1, wherein the frame includes support ribs recessed from the surface of the frame a distance approximately equal to the thickness of the shield.

5. A vehicle tailgate assembly as set forth in claim 1, wherein the frame includes support plates joined to the interior periphery of the frame, recessed from the surface adjacent where the shield is hinged to the frame approximately the thickness of the shield.

6. A vehicle tailgate assembly as set forth in claim 1, wherein the shield includes a griping means for allowing easy grasp and rotating of the shield.

7. A vehicle tailgate assembly as set forth in claim 1, wherein the frame includes a brake light and wherein the brake light is connected by electrical conduit to a connector means for mating connection with an external electrical source.

8. A vehicle tailgate assembly as set forth in claim 7, wherein the connector means is recessed within the frame and comprises a cold lead.

9. A vehicle tailgate assembly as set forth in claim 8, wherein the connector means comprises a male connector which is compatible with female connector capable of being adapted to a vehicle side wall.

* * * * *